United States Patent
Savelyev et al.

(10) Patent No.: US 10,892,886 B2
(45) Date of Patent: Jan. 12, 2021

(54) COMMUNICATIONS SYSTEMS, METHODS AND DEVICES

(71) Applicant: ARM Limited, Cambridge (GB)

(72) Inventors: Roman Savelyev, Oulu (FI); Sila Kayo, Oulu (FI)

(73) Assignee: Arm Limited, Cambridge (GB)

( * ) Notice: Subject to any disclaimer, the term of this patent is extended or adjusted under 35 U.S.C. 154(b) by 77 days.

(21) Appl. No.: 16/054,406

(22) Filed: Aug. 3, 2018

(65) Prior Publication Data
US 2020/0044816 A1 Feb. 6, 2020

(51) Int. Cl.
| | |
|---|---|
| *H04L 7/04* | (2006.01) |
| *H04L 5/00* | (2006.01) |
| *H04L 12/26* | (2006.01) |
| *H04L 12/815* | (2013.01) |

(52) U.S. Cl.
CPC ............ *H04L 7/041* (2013.01); *H04L 5/0048* (2013.01); *H04L 43/16* (2013.01); *H04L 47/22* (2013.01); *H04L 2007/045* (2013.01)

(58) Field of Classification Search
CPC ..... H04L 69/16; H04L 69/166; H04L 65/403; H04L 65/607; H04L 65/80
See application file for complete search history.

(56) References Cited

U.S. PATENT DOCUMENTS

| | | | | |
|---|---|---|---|---|
| 6,055,224 A * | 4/2000 | King | ...................... | H04Q 11/04 370/217 |
| 2005/0074007 A1 * | 4/2005 | Samuels | ................. | H04L 41/00 370/392 |
| 2010/0302979 A1 * | 12/2010 | Reunamaki | ......... | H04M 1/7253 370/311 |
| 2019/0311723 A1 * | 10/2019 | Ullmann | ............... | G10L 19/173 |

OTHER PUBLICATIONS

Wikipedia article "Dijkstra's algorithm" last edited on Jul. 31, 2018, https://en.wikipedia.org/wiki/Dijkstra's_algorithm, 11 pages.
Wikipedia article "Yen's algorithm" last edited on May 13, 2018, https://en.wikipedia.org/wiki/Yen's_algorithm, 7 pages.
"Rolling checksum" as accessed on Aug. 3, 2018, https://rsync.samba.org/tech_report/node3.html, 2 pages.
"Blake2 fast secure hashing" last edited on Feb. 22, 2017, https://blake2.net/, 6 pages.
Wikipedia article "CRC-based framing" last edited on Jan. 23, 2018, https://en.wikipedia.org/wiki/CRC-based_framing, 3 pages.
Wikipedia article "Bit stuffing" last edited on Apr. 4, 2018, https://en.wikipedia.org/wiki/Bit_stuffing, 2 pages.
Wikipedia article "OSI model" last edited on Aug. 2, 2018, https://en.wikipedia.org/wiki/OSI_model, 7 pages.

* cited by examiner

*Primary Examiner* — Gregory B Sefcheck
*Assistant Examiner* — Debebe A Asefa
(74) *Attorney, Agent, or Firm* — Patterson Thuente Pedersen, P.A.

(57) ABSTRACT

Systems and methods including a transmitter resource to transmit a message having one or more packets, each packet having a boundary identifier including a first placeholder generated based on or in response to data in a fixed-sized window of the message, and a second placeholder generated based on or in response to all data in a respective packet, and a receiver resource to receive the message and to detect the boundary identifiers of the respective packets.

20 Claims, 10 Drawing Sheets

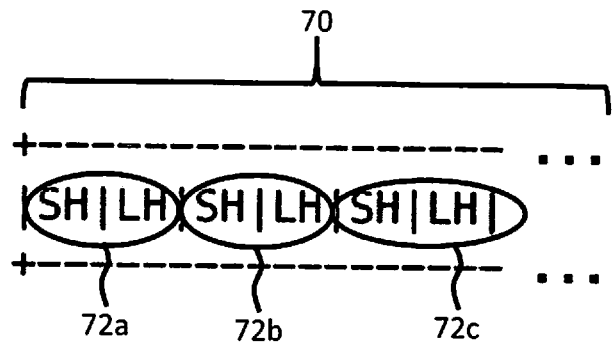
FIG. 6a
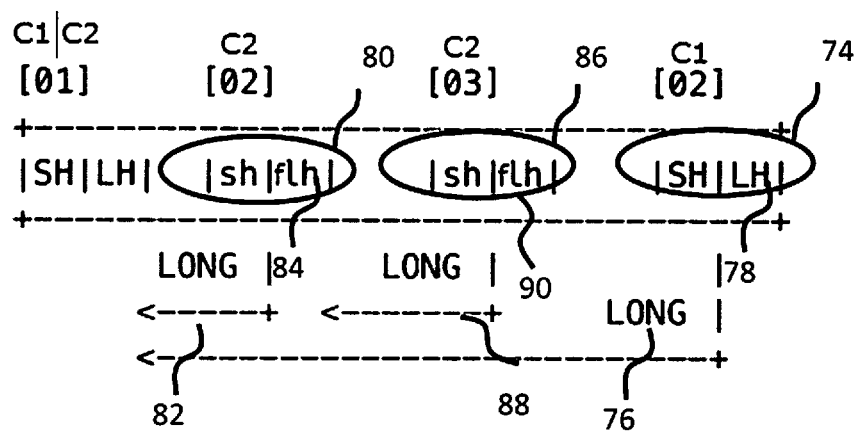
FIG. 6b(i)
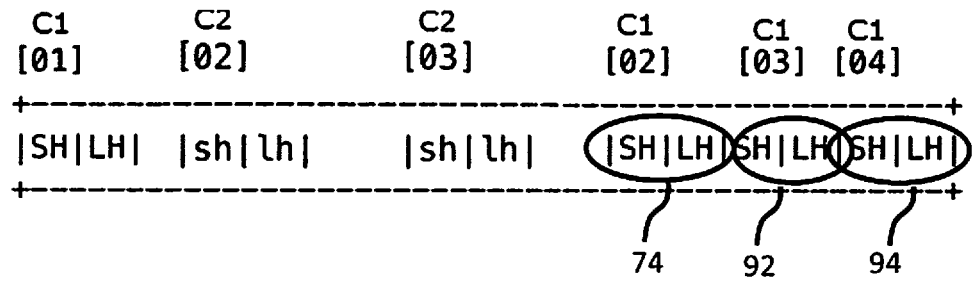
FIG. 6b(ii)

US 10,892,886 B2

COMMUNICATIONS SYSTEMS, METHODS AND DEVICES

TECHNICAL FIELD

The present techniques generally relate to communications systems, methods and devices for data transmissions between a transmitter resource and a receiver resource.

BACKGROUND

Systems are known in which data is transmitted from a transmitting resource to a receiving resource, whereby one or more communication protocols can be employed to ensure that the received data corresponds to the transmitted data, whereby such communication protocols define the rules, syntax, semantics and synchronization of data and possible error recovery methods.

Generally, communication protocols (e.g. TCP/IP) have computational and complexity overheads and can require hardware or software capabilities (e.g. computational, storage, power) to implement the communications protocol which are not available to some systems and resources.

The present techniques provide improvements over the prior art.

SUMMARY

According to a first technique there is provided a method of confirming a packet boundary in a message at a receiver resource, the method comprising: receiving, at a receiver, the message comprising one or more packets, each packet comprising a boundary identifier having a first placeholder generated based on or in response to data in a fixed-sized window of the message and a second placeholder generated based on or in response to all data in the respective packet; detecting, at the receiver, a boundary identifier for a first packet; confirming the packet boundary for a first packet in the message based on or in response to detecting the boundary identifier for the first packet.

According to a further technique there is provided a method for transmitting a message from a transmitter resource, the method comprising: generating, at the transmitter, a plurality of packets of data, each packet comprising: a first placeholder generated based on or in response to data in a fixed-sized window of the message; and a second placeholder generated based on or in response to all data in the respective packet; transmitting the message comprising the one or more packets to a receiver.

According to a further technique there is provided a system comprising: a transmitter resource to transmit a message having one or more packets, each packet having a boundary identifier comprising: a first placeholder generated based on or in response to data in a fixed-sized window of the message; and a second placeholder generated based on or in response to all data in a respective packet; and a receiver resource to receive the message and to detect the boundary identifiers of the respective packets.

According to a further technique there is provided a transmitter resource to transmit a message having one or more packets, each packet having a boundary identifier comprising: a first placeholder generated based on or in response to data in a fixed-sized window of the message; and a second placeholder generated based on or in response to all data in a respective packet.

According to a further technique there is provided a receiver resource to: generate one or more first check-values based on or in response to data in a fixed-sized window in a received message and determine whether a check-value of the one or more first check-values matches a first placeholder of a received message; generate one or more second check-values based on or in response to data within a defined length of the received message and determine whether a check-value of the one more second check-values matches a second placeholder of the message; and confirm a packet boundary based on or in response to the determinations.

According to a further technique there is provided a non-transitory computer readable storage medium comprising code which when implemented on a processor causes the processor to carry out any one of the method claims.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof can be more completely understood in consideration of the following detailed description of various embodiments in connection with the accompanying figures, in which:

FIG. 6a illustratively shows a portion of a message having a plurality of empty data payloads, according to an embodiment;

FIG. 6b(i) illustratively shows a message having confirmation chains, according to an embodiment;

FIG. 6b(ii) illustratively shows a message having confirmation chains, according to a further embodiment;

Figure 1:
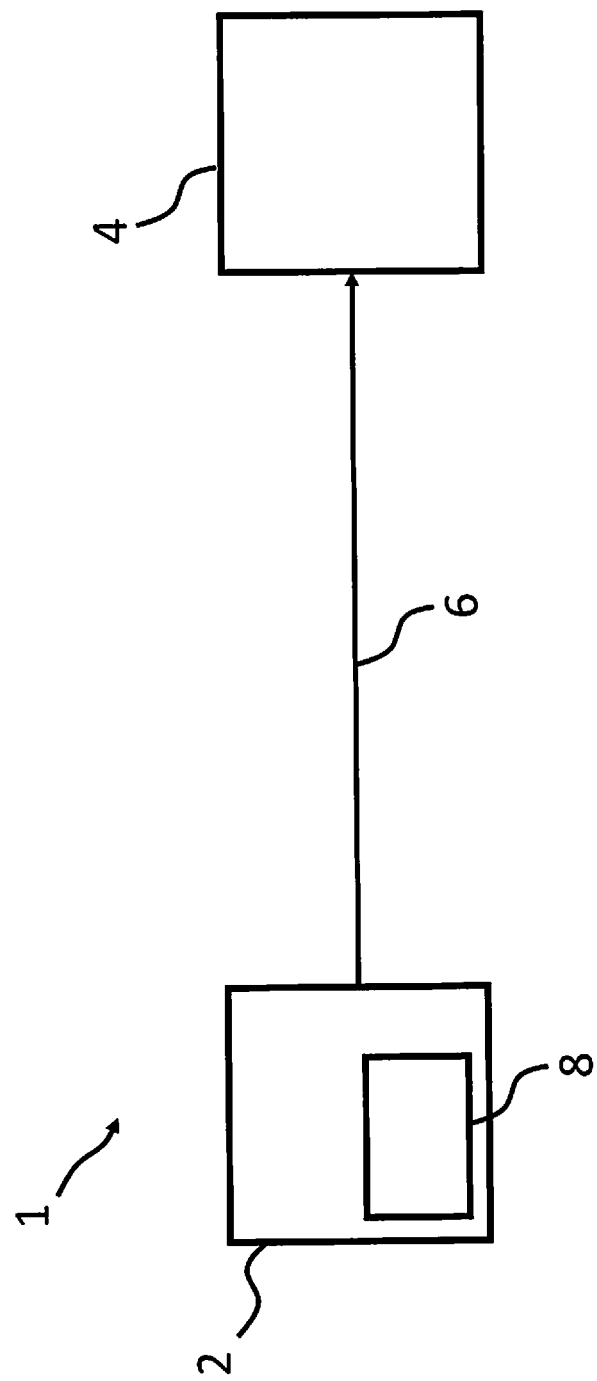
FIG. 1 illustratively shows a block diagram of a system in which a transmitter resource transmits data to a receiver resource, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments are described more fully hereinafter with reference to the accompanying drawings. Like numbering will be used to refer to like elements throughout.

FIG. 1 illustratively shows a block diagram of a system 1 in which a transmitter resource 2 (hereinafter "transmitter") transmits a message comprising one or more packets of data to a receiver resource 4 (hereinafter "receiver") via a transmission medium 6.

The transmitter 2 generates data, for example by way of an application 8, running thereon, whereby the application can comprise a tracing application where one complete trace is used to create a packet.

In an illustrative embodiment the transmitter 2 can comprise a data processing device such as a computer or server, or the transmitter can comprise a hardware block within a computer or server.

In embodiments the transmitter 2 is provided with exclusive access to the transmission medium 6 when transmitting the data, such that a message transmitted from the transmitter 2 is uninterruptible. In some embodiments a message may not be transmitted until transmission of a previous message has completed.

The receiver 4 receives message(s) from the transmitter 2 and processes the packets of data therein to confirm the packet boundaries of the respective packets in the message and to identify the individual packets in the message as will be more fully described hereinbelow.

The transmission medium 6 can be any medium by which data can be sent from one resource to another and can comprise wired and/or wireless communication means.

In an illustrative example, the transmitter 2 can transmit messages to the receiver 4 over a network (e.g. local area network (LAN) or wide area network (WAN), wireless WAN (WWAN), low-power WAN (LPWAN) etc), whereby the transmission medium 6 can comprise ethernet, WiFi, Bluetooth etc.

In a further illustrative example, the transmitter 2 can transmit data to the receiver 4 via wired communication whereby the transmission medium 6 can comprise a serial communications line (e.g. RS-232 or the like).

In a further illustrative example, the transmitter 2 and receiver 4 can be functional units of a data processing device, whereby the transmission medium 6 can comprise the internal hardware communication channels within the data processing device (e.g. buses, interfaces and the like).

As such, the claims are not limited as to the type or form of the transmission medium 6, other than the transmission medium is capable of carrying a message comprising one or more packets of data from a transmitter 2 to a receiver 4.

In embodiments the application 8 generates data, whereby the transmitter creates the message having one or more sequential packets of binary data. In embodiments there are no gaps between the packets, such that every packet can be determined from its boundary(ies) with a neighbouring packet(s) in the data stream.

Figure 2A:
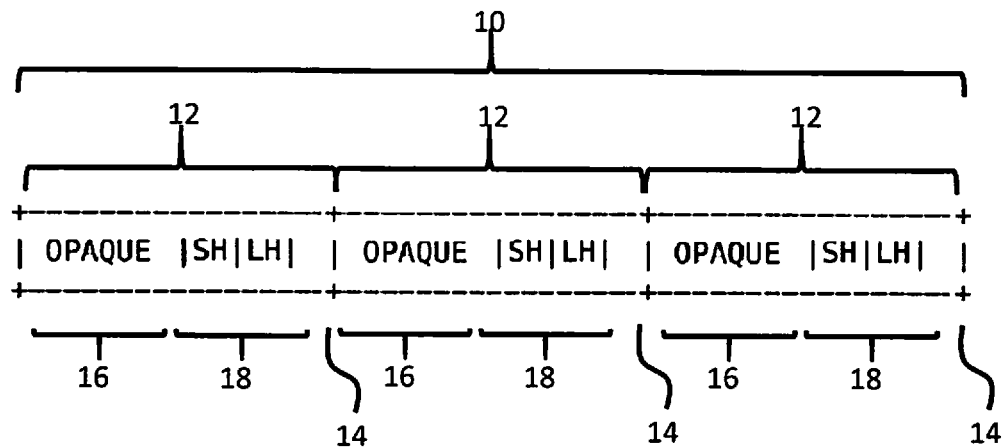
FIG. 2a illustratively shows data payloads of a message, according to an embodiment.
Figure 2B:
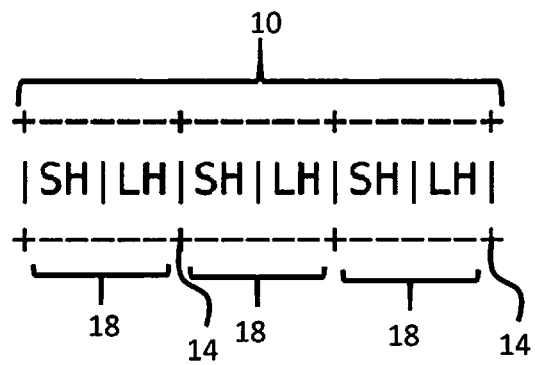
FIG. 2b illustratively shows empty data payloads of the message, according to an embodiment.
Figure 2C:
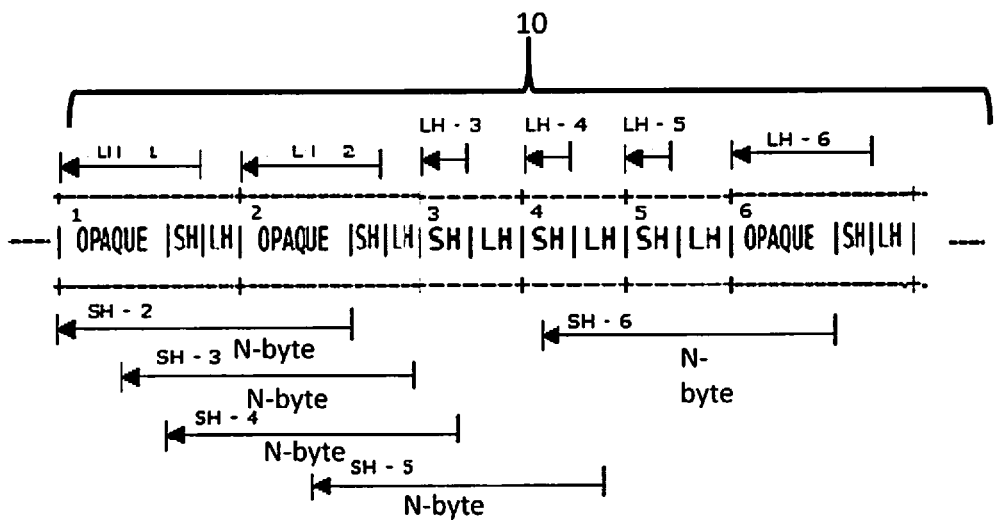
FIG. 2c illustratively shows how placeholders in the message can be generated, according to an embodiment.

FIG. 2a illustratively shows an example of a message 10, whereby, for simplicity, message 10 is depicted to have three packets of data 12, whereby packets 12 in the message 10 are separated from a neighboring packet by a packet boundary 14, denoting where, for example, one packet terminates and a successive packet immediately following that packet begins. FIG. 2b illustratively shows three packets with empty data (or no) data payloads in the message 10. FIG. 2c illustrative shows how placeholders in the message 10 can be generated.

Each packet 12 depicted in FIG. 2a comprises a data payload 16, which in the present illustrative example comprises opaque data although the claims are not limited in this respect, and some packets can include an empty data payload (0 bytes).

The size of the data payload 16 can vary between packets, from a maximum data payload size (e.g. 1 kB) to a minimum data payload size of 0 bytes, as depicted in the message 30 of FIG. 2b which depicts message 10 comprising three packets with empty data payloads.

Each packet 10 depicted in FIGS. 2a-2c also comprises a boundary identifier 18, which can be used to detect a packet boundary 14 between that packet and a next packet in the message.

The boundary identifier 18 comprises a first placeholder (hereafter "short placeholder" (SH)), and a second placeholder (hereafter "long placeholder" (LH)).

The short placeholder SH is M-bytes long (where 'M' is an integer), and is calculated using data of one or more packets over a fixed-sized rolling window having a predefined length (e.g. N-bytes), which data can include short placeholders, long placeholders, data payload(s) of one or more packets in the message. In the illustrative example of FIG. 2c, the N-byte window used to calculate the short placeholders for packets 2-6 are depicted as SH-2 to SH-6. (the N-byte window for the first packet is not depicted).

As an illustrative example, the data in the fixed-sized rolling window can undergo a transformation using a suitable hashing function (e.g. Blake2), a checksum function (e.g. a rolling checksum such as the rsync algorithm) or the like, to generate the short placeholder for that fixed-sized rolling window. In embodiments the short placeholder comprises two bytes, although the claims are not limited in this respect, and any length of short placeholder can be provided.

In an illustrative example the transmitter can comprise a circular buffer having a fixed length (e.g. equal to the fixed-sized rolling window) to receive data with which to create the messages. In embodiments the transmitter will fill the circular buffer with zeros which are continuously pushed out as data is received from a data source (e.g. from an application). When data corresponding to the length of the fixed-sized rolling window is received in the circular buffer and a boundary identifier is required, the transmitter will calculate a short placeholder based on or in response to the data in the buffer and append the short placeholder to the message, with the short placeholder added to the buffer.

The transmitter will then generate a long placeholder based on or in response to data in the packet (e.g. the short placeholder and data payload (if present)) and append the long placeholder to the message after the short placeholder to create the boundary identifier, with the long placeholder added to the buffer.

The long placeholder LH of a packet can be an m-byte length (where 'm' is an integer) relating to the data in that packet, as depicted in FIG. 2c which illustratively shows that only the data in a particular packet is used to generate the long placeholder for that packet, whereby the long placeholder LH-1 for packet 1 is generated using all the data of packet 1, the long placeholder LH-2 for packet 2 is generated using all the data of packet 2, and so on.

The data in the packet can undergo a transformation using a suitable hashing function (e.g. Blake2), checksum function (e.g. a rolling checksum) or the like to generate the long placeholder LH for that packet. In embodiments the long placeholder LH comprises two bytes, although the claims are not limited in this respect, and any length of long placeholder can be provided.

Subsequent data received at the transmitter (e.g. from a data source, short placeholders, long placeholders) will overwrite the data in the circular buffer and the transmitter will continue to calculate the short placeholders and long placeholders as described above to denote packet boundaries of the respective packets in the message until the message completes.

As above, the size of the data payload 16 can vary between packets whereby the transmitter will create packets of fixed- or variable-sized packet length up to a maximum packet length ($P_{Max}$).

A packet of any size from a minimum size having an empty data payload (as depicted in FIG. 2b) to $P_{MAX}$ will include a boundary identifier 18 having a short placeholder SH and a long placeholder LH.

As above, the receiver 4 receives message(s) from the transmitter 2 and processes the message(s) to detect the boundary identifiers in each packet so as to confirm respective packet boundaries and identify the individual packets within the message(s), such that the data in the payloads can be extracted from the respective packets and processed at the receiver and/or another resource.

Figure 3:
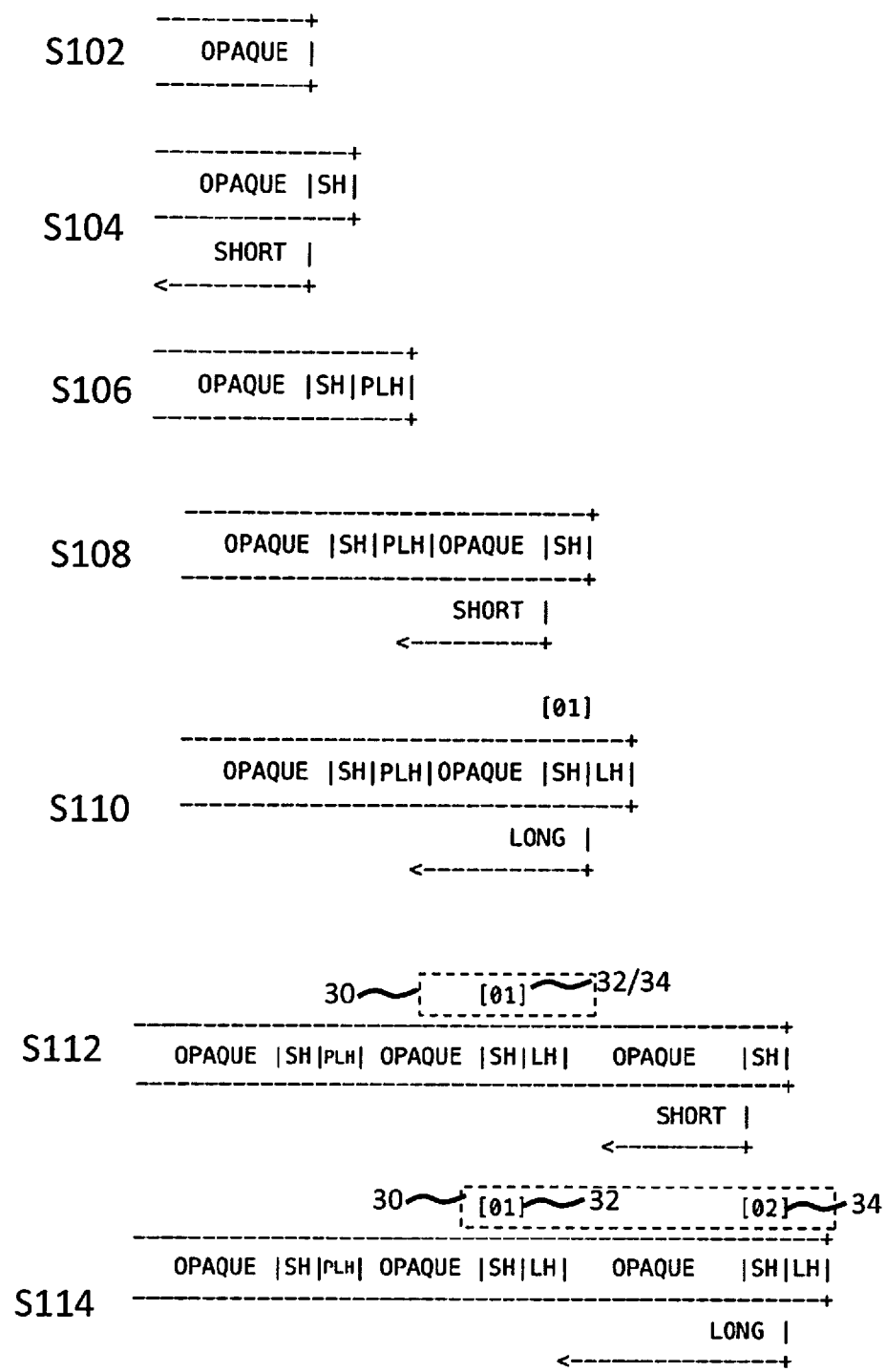
FIG. 3 illustratively shows an example of a process of receiving a message at a receiver and detecting boundary identifiers, according to an embodiment.

FIG. 3 illustratively shows an example of a process 100 of receiving a message at the receiver and detecting the boundary identifiers to confirm the boundaries and identify the respective packets.

At S102 the receiver receives data of first packet of the message, and at S104 calculates a plurality of short check-values using the data in the message starting from the first byte. The receiver calculates the short check-values using the same techniques which the transmitter used to create the short placeholders in the message (e.g. a transformation using a suitable hashing or checksum function or the like). The first short placeholder in the message will be detected by the receiver when a short check-value (SHORT) generated by the receiver matches the first short placeholder SH in the message.

When a short check-value matches the first short placeholder in the received message, the receiver will generate a long check-value using the data from the first received byte.

As the size of the long placeholders in the received message are not a fixed size, but are calculated for each individual data packet, the receiver cannot confirm whether the initial data received included a complete packet or a portion of a packet as there is no previous boundary is confirmed for that message. Therefore, in some embodiments, the receiver requires at least two short placeholders to be detected in the message before a long check-value can be confirmed, and at S106 the receiver notes the position of the detected first short placeholder and the possible long placeholder (PLH) as an unconfirmed packet boundary (i.e. unconfirmed hit). In embodiments the receiver can calculate a long check-value for the PLH, or can take m-bytes following the detected first short placeholder as the PLH.

At S108 the receiver generates further short check-values using data from the message over an N-byte fixed-sized rolling window in the message.

The second short placeholder in the message will be detected by the receiver when the second short check-value generated by the receiver matches the second short placeholder in the message.

At S110, having identified the second short placeholder, the receiver calculates a first long check-value using the data in the message after the unconfirmed packet boundary. When the first long check-value (LONG) matches the long placeholder immediately following the second short placeholder, then the receiver will have detected the boundary identifier and confirm the true packet boundary (i.e. a confirmed true hit).

At S112, a third short placeholder in the message is identified when a third short check-value generated by the receiver using data over the fixed-sized rolling window matches the third short placeholder in the message, and a second long placeholder will be identified when a second long check-value calculated at the receiver using data back to the previous boundary identifier matches the long placeholder following the third short placeholder in the message. The receiver will have detected the boundary identifier and will confirm the true packet boundary.

The receiver continues to generate check-values to detect boundary identifiers for all packets in the received message. As the individual packets can be identified from the confirmed boundaries, the data payloads of the individual packets can be extracted and processed at the receiver and/or another resource.

In embodiments the receiver generates a data structure capturing the confirmed hits. As depicted in FIG. 3, the data structure comprises a confirmation chain 30, represented as a singly-linked list comprising P-nodes (where P is an integer), where each node is representative of a confirmed hit, with the first confirmed hit of the message taken to be the head node 32, and the most recent confirmed hit taken to be the tail node (tail) 34. The singly-linked list grows as the receiver confirms true packet boundaries as the message is processed.

The numbers in the square brackets shown in FIG. 3 denote the distance from the tail 34 to the head 32. As above, as the confirmation chain 30 relates to confirmed hits, the confirmation chain represented as a singly-linked list will not generally include nodes relating to unconfirmed hits.

As the nodes in the confirmation chain relate to confirmed true packet boundaries, the confirmation chain can be used to identify the individual packets of the message, such that the receiver or further resource can extract the data payload from the respective packets.

As the confirmation chain in FIG. 3 comprises a single path from the tail to the head, the receiver will use the confirmed boundaries represented by confirmation chain 30 to identify the respective packets.

The confirmation chains described above and depicted in FIG. 3 generally relate to confirmed true hits, whereby short and long check-values generated at the receiver match short and long placeholders of boundary identifiers in a message.

In some embodiments short and long check-values generated at the receiver match data values in the received message which are not part of a boundary identifier. Such hits can occur due to data corruption in the message, data collisions (e.g. where a weak transformation function is used) or can be due to engineering at the transmitter. In embodiments increasing the size of the short and/or long placeholder can reduce the likelihood of data collisions. However, it will be appreciated that increasing the size of the placeholders will increase the computational strain at the receiver when generating and attempting to match short and/or long check-values and may not be suitable for all applications or resources. It will also be appreciated that increasing the size of the placeholders can also increase the protocol overhead.

In embodiments, the receiver can generate short check-values which can match data in the message that is not a short placeholder. Such incorrect matches can result from collisions, data corruption or engineered hits whereby the transmitter purposely includes data in the data payload which will cause a hit.

When the receiver incorrectly matches a short check-value with a false short placeholder in a received message, the receiver can attempt to generate a long check-value to confirm a long placeholder after the false short placeholder. In embodiments, the long check-value can match a false long placeholder following the false short placeholder, resulting in a false boundary identifier being detected, and a false boundary being incorrectly confirmed ("false hit").

Figure 4A:
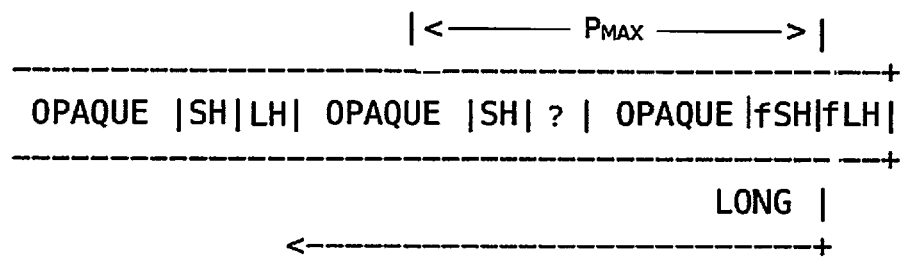
FIGS. 4a and 4b illustratively show examples of generating false placeholders, according to an embodiment.
Figure 4B:
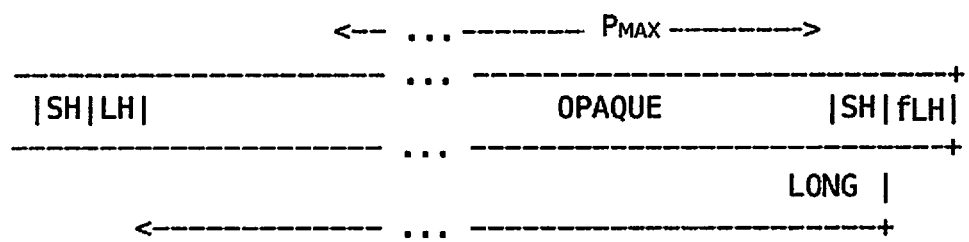

FIGS. 4a and 4b illustratively show examples of generating false placeholders whereby the data depicted as fSH is a false short placeholder detected by the receiver and resulting from, for example, data collisions, data corruption or an engineered hit.

On detecting fSH, the receiver attempts to generate long check-values using data in the message received before fSH. As depicted in FIG. 4a, as the receiver could not confirm a packet boundary in the packet before the fSH a long check-value is generated (LONG) using data from two different packets, where, whereby LONG matches the data following fSH, taken to be a long placeholder (fLH). As such, the receiver will detect a false boundary identifier (fSH and fLH) and will incorrectly confirm a false packet boundary (false hit). Such a false hit can, in turn, be included in a confirmation chain, which can result in the receiver or a further resource unsuccessfully identifying individual packets and being unable to extract the data payloads therefrom.

As the calculations to generate the false hit can use data from more than one packet, the receiver will use more computational resources than necessary because a long placeholder should only relate to data in a single packet.

As depicted in FIG. 4b, the receiver can, as also depicted in FIG. 4a, generate a long check-value (LONG) using data from two different packets because a previous boundary was not confirmed, but as the data used to generate LONG exceeds ($P_{MAX}$), the detected boundary identifier of SH and fLH is taken to be an unconfirmed hit.

In other embodiments the resource can cease generating long check-values when $P_{MAX}$ is exceeded, taking the bytes after a false short placeholder, to be a possible long placeholder, thereby taking the boundary to be an unconfirmed hit.

Packets for which a boundary identifier cannot be detected, or where a boundary is unconfirmed can be discarded by the receiver, and the information therein lost.

Figure 5:
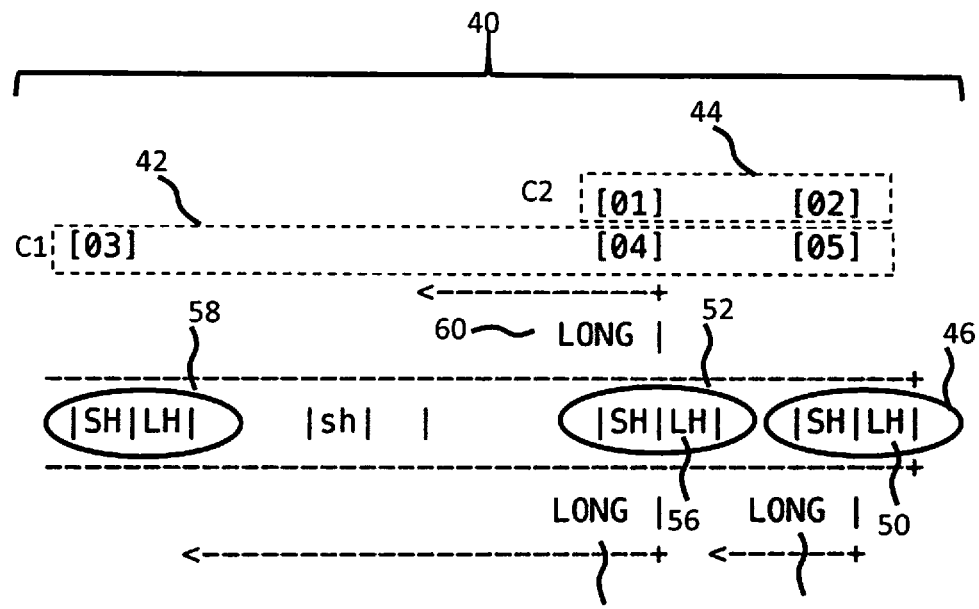
FIG. 5 illustratively shows a plurality of confirmation chains of a message, according to an embodiment.

Whilst FIG. 3 depicts a data structure comprising a single confirmation chain, a receiver can generate a plurality of confirmation chains for the same message as illustratively shown in FIG. 5, whereby a first confirmation chain 42 relates to one or more confirmed hits (true and/or false hits), and a second confirmation chain 44 relates to one or more confirmed hits (true and/or false hits).

The first confirmation chain 42 is depicted to have five nodes, whereby the tail node [5] relates to the packet boundary confirmed by the boundary identifier 46 (whereby the long check-value 48 matches the long placeholder 50). The second to last node [4] of the first confirmation chain (C1) 42 relates to the packet boundary confirmed by the boundary identifier 52 (whereby the long check-value 54 matches the long placeholder 56). The third to last node [3] of the first confirmation chain 42 relates to the packet boundary confirmed by the boundary identifier 58. The head [1] and second node [2] of the first confirmation chain 40 are not depicted in FIG. 5.

The second confirmation chain (C2) 44 comprises two nodes, whereby the head [1] relates to the packet boundary confirmed by the boundary identifier 52 (whereby long check-value 60 (LONG) matches the long placeholder 56).

The tail [2] relates to the packet boundary confirmed by the boundary identifier 46 (whereby the long check-value 48 matches the long placeholder 50).

A such, multiple confirmation chains provide a way to track confirmed hits (true and/or false hits). The receiver can then apply an algorithm to determine which confirmation chain is the most appropriate for the receiver to rely on, so as to correctly identify the individual packets and extract the data payloads.

Furthermore, as depicted in FIG. 5 different confirmation chains can include the same hits when the same data is used to confirm the same placeholders in the message.

As described above, the receiver requires that data payloads of packets for which the receiver cannot confirm a boundary can be discarded and the data therein lost.

To address the loss of data, and as illustratively shown in FIG. 6a, the transmitter can fill or stuff at least the start portion of the message transmitted to the receiver with empty data packets (no data payload) such that each empty packet comprises a boundary identifier (depicted as 72a to 72c) without any data payload. As described above packets which comprise empty payloads will include at least one short placeholder and a long placeholder to allow a receiver detect a boundary identifier and confirm a packet boundary.

Such stuffing of empty packets can be useful to avoid loss of data. For example the total size of the empty packets at the start of the message will preferably be greater than or equal to the fixed-sized rolling window, such that, in an illustrative embodiment, the receiver will use the final short placeholder of the stuffed empty packets to determine a possible long placeholder, and subsequently use the boundary identifier of the first packet following the last empty packet to confirm a boundary. Such functionality means that the first packet following the last empty packet can be included in the confirmation chain rather than being lost or discarded as described above in FIG. 3.

Furthermore, when the receiver confirms boundaries for the empty packets, such confirmed hits will contribute to a confirmation chain increasing the length thereof.

In some embodiments the transmitter can periodically, randomly or pseudo-randomly stuff portions other than the beginning of the message with empty packets, such that a receiver detecting the message mid-transmission will be capable of confirming a packet boundary for a packet having non-empty data payloads following the stuffed portions.

As described above, false hits can be detected on the basis of, for example, data collisions, data corruption or engineered hits and will also contribute to the confirmation chains. An algorithm can be applied to the confirmation chains to detect the most appropriate one to use as the basis to identify the individual packets. In embodiments the longest confirmation chain can be taken to be the most appropriate.

As depicted in FIG. 6b(i), the receiver generates two confirmation chains C1 & C2. Both confirmation chain C1 & C2 share a common head [1], whilst confirmation chain C1 comprises a tail [02], which relates to the packet boundary confirmed by the boundary identifier 74 (whereby long check-value 76 (LONG) matches the long placeholder 78).

Confirmation chain C2 comprises a second node [02], which relates to the packet boundary confirmed by the false boundary identifier 80 (whereby long check-value 82 (LONG) matches the false long placeholder 84).

Confirmation chain C2 comprises a tail [03], which relates to the packet boundary confirmed by the false boundary identifier 86 (whereby long check-value 88 (LONG) matches the false long placeholder 90).

Therefore, of the confirmation chains depicted in FIG. 6b(i), the second confirmation chain C2, which relates to false boundary identifiers is longer than confirmation chain C1 which does not relate to any false boundary identifiers. Applying a longest path algorithm to C1 and C2 would determine the second confirmation chain C2 to be the most appropriate confirmation chain, whilst an application or resource relying on the second confirmation chain may not be able to identify the individual packets to extract the data payloads.

To mitigate the impact of false hits on the system, the transmitter can introduce at least one empty packet into the message for every short placeholder in the message.

As an illustrative example, and as depicted in FIG. 6b(ii), empty packets 92 and 94 are provided after boundary identifier 74, such that first confirmation chain C1 will comprise four nodes and applying a longest path algorithm would determine the first confirmation chain C1 to be the most appropriate confirmation chain.

Whilst the confirmation chains have been described above as being represented as singly-linked lists, the claims are not limited in this respect, and in other embodiments the confirmation chains can be represented as a different data structure such as a graph comprising one or more nodes or elements, in which each node or element is representative of a hit (unconfirmed hit or confirmed hit (true and/or false hits)).

Figures 7A, 7B, 7C:
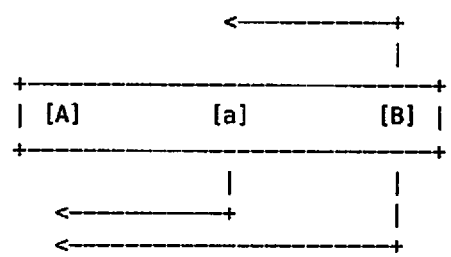
FIGS. 7a-c illustratively shows an example of confirmation chains represented as a directed acyclic graph (DAG), according to an embodiment.

FIGS. 7a-c illustratively show the data structure can be a directed acyclic graph (DAG), the DAG having a single source node (a vertex, to which no edges lead and depicted as "A"), at least one sink node (a vertex(ices), from which no edges originate and depicted as "D"), and one or more ordinary nodes (depicted as "B" & "C") connected to the source, sink and/or each other along one or more edges. As will be understood the source, sink and ordinary nodes are representative of a confirmed or unconfirmed hit.

The DAG can be generated at the receiver (or another resource) and used as an input to an algorithm to determine which is the most appropriate confirmation chain, whereby the most appropriate chain can comprise the confirmation chain with the most nodes, or shortest path or longest path. Such an algorithm can be Dijkstra's algorithm, Yen's algorithm or any suitable algorithm although the claims are not limited in this respect.

Each edge in the graph can be provided with a weight dependent on whether the edge originates from a node relating to a confirmed hit or an unconfirmed hit. For example, nodes relating to a confirmed hit (true and/or false hit) can be provided with a higher weight (e.g. weight=1) than those relating to an unconfirmed hit (e.g. weight=0).

Furthermore, each unconfirmed hit has a weightless edge to the closest preceding confirmed hit. Such functionality means that algorithms that require unbroken paths so as to determine the length of the path (e.g. Yen's algorithm), will be provided with unbroken paths having nodes relating to unconfirmed hits therealong. If the unconfirmed hits did not have an edge to the closest preceding confirmed hit, then there would be a broken path between the source and a sink.

As such a collection of paths between the source and all sinks in the confirmation chains can be ranked dependent on the weights applied to the edges therealong. The most appropriate path, and therefore, confirmation chain can then be selected based on or in response to rankings.

In an ideal scenario, a message will result in a single confirmation chain represented as a single linear graph having a single path with a plurality of nodes between the source and a single sink node, whereby each node comprises exactly one outgoing edge.

However in some embodiments, false hits resulting from, for example, data corruption, data collisions and/or engineered hits can mean that a confirmation chains which includes nodes relating to false hits can be determined to be more appropriate than confirmation chains that contain only true hits.

As illustratively depicted in FIGS. 7b and 7c, '[a]' is a false hit, whilst '[A]' and [B]' are true hits. As such, a first confirmation chain comprising a false hit i.e. 3 nodes (AbB) is longer than a second confirmation chain comprising only confirmed hits i.e. 2 nodes (AB). As such, the confirmation chain comprising the false hit can be determined to be more appropriate than that comprising the confirmed hit, and a receiver may not be able to correctly identify individual packets of the message when relying on the first confirmation chain.

In embodiments, a resource which receives the confirmation chains from the receiver can ignore the determination of the most appropriate path made by the receiver and will independently determine which of the confirmation chains is most appropriate.

Figure 8A:
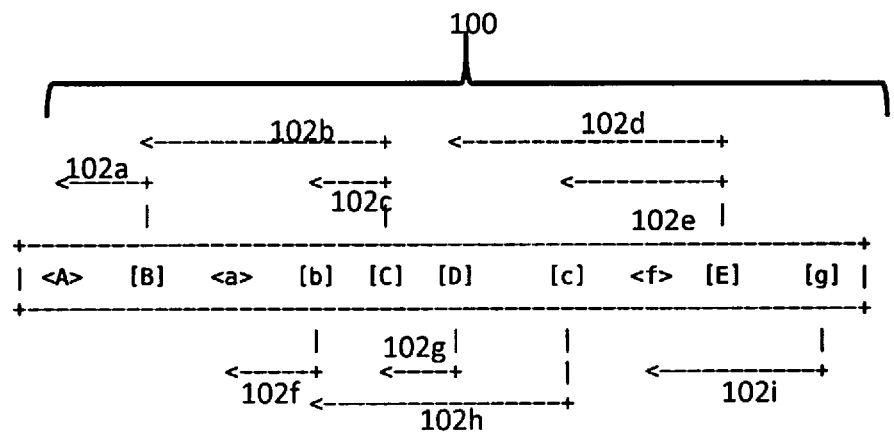
FIGS. 8a-b illustratively shows an example of confirmation chains represented as a directed acyclic graph (DAG), according to an embodiment.

FIG. 8a illustratively shows a plurality of packets (<A> to [g]) of a message 100, whereby the arrows 102a-i depict confirmed hits (true and/or false hits), extending from the position of detected long placeholder of one packet to a detected long placeholder of a previous packet, whereby <A>, <a> and <f> are unconfirmed hits, whilst [B], [b], [C], [D], [c], [E] and [g] are confirmed hits (true and/or false hits).

Figure 8B:
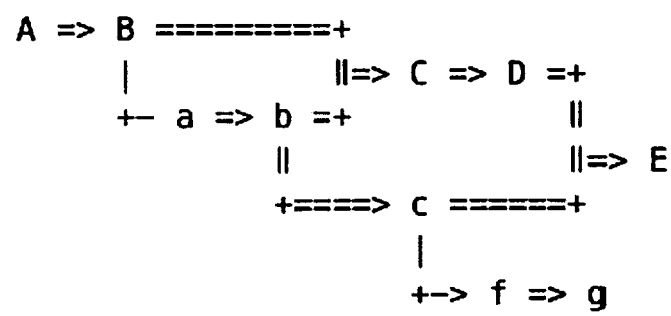

FIG. 8b illustratively shows how confirmation chains derived from the FIG. 8a can be represented as a graph, which in FIG. 8b comprises a DAG having a single source node ([A]), and one or more sink nodes, from which no edges originate ([E] and [g]). and ordinary nodes [B], <a>, [b], [C], [D], [c] and <f>.

In FIG. 8b, confirmed hits (true and/or false hits) comprise a weighted edge therebetween, and every unconfirmed hit comprises a weightless edge to the closest preceding confirmed hit such that otherwise broken paths are connected between the source node and sink nodes.

As above, data collisions, data corruptions and/or engineered hits will result in false hits, with each false hit resulting in a confirmation chain comprising a plurality of nodes, and it will be appreciated that the computational requirements increase as the number of false hits in the message increases.

As depicted in FIG. 8b, four confirmation chains are depicted, each ordinary node in a confirmation chain having at least one outgoing edge with nodes [B], [b] and [c] each having two outgoing edges.

Applying weights to the edges in the graph (e.g. "=" is weight 1; "-" is weight 0), the confirmation paths are determined to have the following weights:

ABCDE=4;
ABabCDE=5;
ABabcE=4;
ABabcfg=4;

The confirmation chain with the highest weight can then be determined to be the most the appropriate confirmation chain from which individual packets can be identified by the receiver or other resource and the data payloads of the individual packets extracted.

In some embodiments the graph can be used as an input for an algorithm(s) to determine the most appropriate confirmation chain from which packets will be provided to an application or resource. Such an algorithm can include Yen's algorithm for determining a shortest path. A solver at the receiver returns a collection of paths between a source (depicted as [A] in FIG. 8b), and all sinks (depicted as [E] and [g]), whereby the paths are ranged by weight.

As above, the paths can be ranked by appropriateness, and can, in turn be provided to a resource which utilises the payload data, which can use the determined confirmation chain or choose a different chain.

Such a determination can be made by a receiver or resource parsing the data of the data payloads and determining a different confirmation chain would be more appropriate.

For example, the receiver or resource can attempt to parse data of data payloads extracted from packets identified from a first confirmation chain determined to be the most appropriate. A parsing error can indicate that the extracted data payload is invalid and require the receiver or resource to parse data payloads extracted from packets identified from a second confirmation chain determined to be the next most appropriate. The process continues until the data of all data payloads of the identified packets are successfully parsed or until all confirmation paths are exhausted without the data being validated. In such a case the receiver can take an action such as alerting a user (via a warning signal on an interface, or requesting the transmitter to resend the message).

Figure 9A:
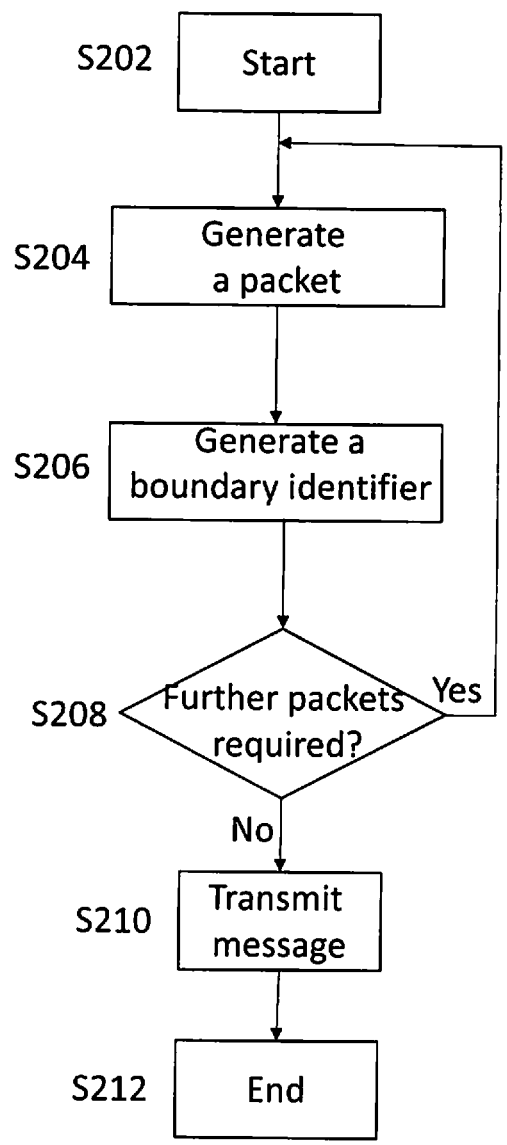
FIG. 9a illustratively shows a flow diagram of a process in which a transmitter generates a message, according to an embodiment.
Figure 9B:
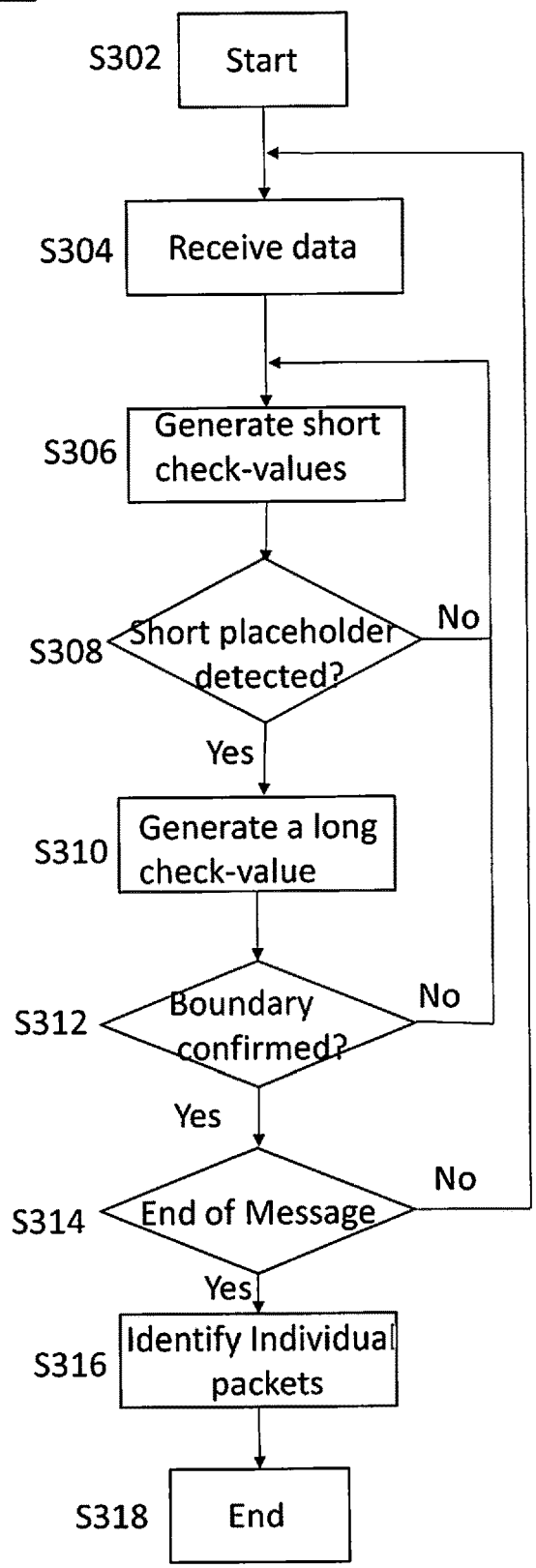
FIG. 9b illustratively shows a flow diagram of a process in which a receiver confirms packet boundaries in the message and identifies individual packets, according to an embodiment.

FIG. 9a illustratively shows a flow diagram of a process 200 in which a transmitter generates a message comprising one or more packets; and FIG. 9b illustratively shows a flow diagram of a process 300 in which a receiver identifies individual packets of data in the message.

At S202 the process 200 starts, whereby a transmitter receives data from a data source (e.g. an application such as a tracing application).

At S204 the transmitter begins to create a message by generating a packet (e.g. comprising data from a data source or an empty packet).

At S206 the transmitter generates a boundary identifier for the packet, whereby the transmitter calculates a short placeholder using data from a fixed-size rolling window (e.g. using a transformation function) and appends the short placeholder to the message. The transmitter then calculates a long placeholder from all data in the packet (e.g. using a transformation function) and appends the long placeholder after the short placeholder.

At S208 the transmitter determines whether further packets are required and when further packets are required the transmitter repeats S204 to S208.

At S208 when further packets are not required and at S210 the transmitter transmits the message to the receiver via any suitable transmission medium.

At S212 the process ends.

The process 300 at the receiver begins at S302, whereby at S304 the receiver receives data from the transmitter and at S306 generates short check-values for all data in the received message up to a length of the fixed-size rolling window.

At S308 the receiver continues to generate short check-values until a short placeholder is detected in the received message by matching the short check-values with data values in the received message.

At S308, when a short placeholder is detected, the receiver, at S310, generates a long check-values to attempt to confirm a boundary.

At S312 when the long check-values do not match the values after the detected short placeholder the receiver will attempt to detect a boundary identifier by repeating S306 to S312.

At S312, when the long check-value matches a data value following the detected short placeholder the receiver confirms the boundary.

At S314, when further data is received in the message the receiver repeats S304 to S314 to confirm boundaries of other packets in the message.

At S314, when no further data is received in the message the receiver (or a further resource) at S316 identifies the individual packets of the message to extract the data payloads therefrom.

In embodiments the receiver can generate a data structure capturing the confirmed hits. In some embodiments the data structure can also capture the unconfirmed hits. As an illustrative example, the data structure can comprise one or more confirmation chains comprising one or more nodes representative of the boundaries. The receiver can then apply an algorithm to determine the most appropriate confirmation chain from which the individual packets are identified.

At S318, the process ends.

Figure 10:
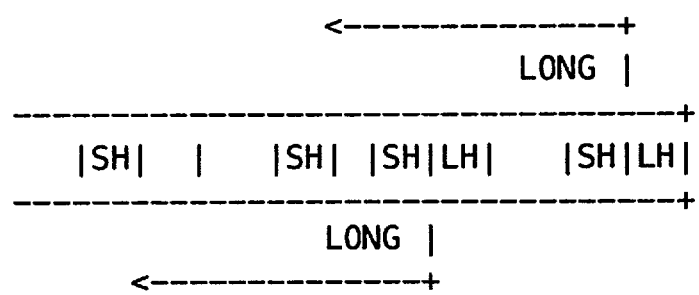
FIG. 10 illustratively shows an optimization when generating check-values, according to an embodiment.

In some embodiments optimizations can be introduced to enable the transmitter and/or receiver to function more efficiently or with less computational strain. FIG. 10 illustratively shows an example of such an optimization whereby a short placeholder is calculated over a fixed rolling window which means that it will be calculated from data within that fixed-rolling window, which, as set out above, can include other short placeholders, long placeholders, data payloads and/or other data in the message.

Taking the short placeholder and long placeholders to be 2 bytes each, the minimum size for an empty packet is 4 bytes (SH (2 bytes)+LH (2 bytes)).

When the receiver matches a short check-value with a short placeholder in a received message and the next byte also results in a match between a short check-value with a short placeholder, the receiver will not calculate a long check-value for the later identified short placeholder because the size of data between the identified short placeholders is less than that required for an empty packet (54 bytes). As such, the receiver saves on the computational resources required to generate the long check-values.

As a further illustrative example of an optimization, in some embodiments the message can include one or more identifiers (e.g. codes, values, flags or the like) which the transmitter, receiver or other resource can use to, for example, reduce computational strain or improve efficiency when generating confirmation chains, processing confirmation chains, determining appropriate confirmation chains, processing opaque data etc.

As further illustrative example of an optimization, the data payloads can have an identifier embedded therein relating to its length (e.g. using a type-length-value (TLV) encoding scheme), such that a receiver or resource can readily validate the length of the extracted data and determine whether the length of the extracted data is as expected. When not as expected the extracted data will be discarded.

As further illustrative example of an optimization, a transmitter may not transmit messages longer than a maximum length, whereby an identifier (e.g. a single-bit flag) included to the payload length will enable receiver determine when the message is a fragment of a message. For example, a flag value of 0 can denote that a packet is a head fragment of the message whilst a flag value of 1 can denote the tail fragment.

To compose a complete message, the receiver combines a head fragment with every following tail fragment. The process is concluded when a new head fragment is encountered. A message can have no tail fragments, but shall have one head fragment.

As further illustrative example of an optimization, each message can include an increasing counter value. Receiver will pick the chain, where sequence number is uninterrupted, and its value grows continuously.

Sequence numbers can be used to arrange for re-transmission within applications that implement duplex communication. Including sequence numbers is a relatively simple way to implement logical streams whereby the transmitter and receiver can agree on using different ranges of running sequence numbers for different logical streams.

As further illustrative example of an optimization, when the transmission protocol is used for transmitting plain strings, including NULL-terminator into data payloads can reduce the likelihood of false hits, and therefore reduce the likelihood of the receiver generating false confirmation chains.

In some embodiments static parameters will be known or accessible to both the transmitter and/or receiver to enable either resource to perform the techniques disclosed herein.

As an illustrative example the length of the fixed-sized rolling window can be such a static parameter.

Similarly, the length of the of the short and long placeholders, and how they are calculated can also be static parameters, such that the receiver can generate a check-value of the same size and in the same manner to determine whether there is a match.

$P_{Max}$ can also be a static system parameter. In embodiments $P_{MAX}$ will be maintained relatively small because messages having a relatively small $P_{MAX}$ will generally result in larger confirmation chains and provide for faster recovery after data corruption in comparison to messages having a relatively large $P_{MAX}$. Furthermore, corrupted packets are not used or are discarded by the receiver, but the loss of such data can be alleviated when a packet bears less data by having a relatively small $P_{MAX}$. Furthermore, messages having a relatively large $P_{MAX}$ will require the resource to use more computational resources when generating long check-values.

Embodiments of the present techniques provide a non-transitory data carrier carrying code which, when implemented on a processor, causes the processor to carry out the methods described herein.

The techniques further provide processor control code to implement the above-described methods, for example on a general-purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code can be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques can comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog or VHDL (Very high speed integrated circuit Hardware Description Language). As the skilled person will appreciate, such code and/or data can be distributed between a plurality of coupled components in communication with one another. The techniques can comprise a controller which includes a microprocessor, working memory and program memory coupled to one or more of the components of the system.

Computer program code for carrying out operations for the above-described techniques can be written in any combination of one or more programming languages, including object-oriented programming languages and conventional procedural programming languages. Code components can be embodied as procedures, methods or the like, and can comprise sub-components which can take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques can suitably be embodied in a logic apparatus comprising logic elements to perform the above-described methods, and that such logic elements can comprise components such as logic gates in, for example a programmable logic array or application-specific integrated circuit. Such a logic arrangement can further be embodied in enabling elements for temporarily or permanently establishing logic structures in such an array or circuit using, for example, a virtual hardware descriptor language, which can be stored and transmitted using fixed or transmittable carrier media.

In an embodiment, the present techniques can be realised in the form of a data carrier having functional data thereon, said functional data comprising functional computer databases to, when loaded into a computer system or network and operated upon thereby, enable said computer system to perform all the above-described method.

It will be understood that, although the terms first, second, etc. can be used herein to describe various features, these features should not be limited by these terms. These terms are only used to distinguish one feature from another. Furthermore, the term "and/or" includes any and all combinations of one or more of the associated listed items.

Furthermore, the terminology used herein is for the purpose of describing embodiments only and is not intended to be limiting. For example, as used herein the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Various embodiments of systems, devices, and methods have been described herein. These embodiments are given only by way of example and are not intended to limit the scope of the claimed inventions. It should be appreciated, moreover, that the various features of the embodiments that have been described can be combined in various ways to produce numerous additional embodiments. Moreover, while various materials, dimensions, shapes, configurations and locations, etc. have been described for use with disclosed embodiments, others besides those disclosed can be utilized without exceeding the scope of the claimed inventions.

Persons of ordinary skill in the relevant arts will recognize that the subject matter hereof can comprise fewer features than illustrated in any individual embodiment described above. The embodiments described herein are not meant to be an exhaustive presentation of the ways in which the various features of the subject matter hereof can be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim can refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of confirming a packet boundary in a message at a receiver resource, the method comprising:
receiving, at a receiver, the message comprising one or more packets, each packet comprising a boundary identifier having a first placeholder calculated by transforming data in a fixed-sized rolling window of the message and a second placeholder calculated by transforming all data in the respective packet including the first placeholder;
detecting, at the receiver, a boundary identifier for a first packet; and
confirming the packet boundary for a first packet in the message based on or in response to detecting the boundary identifier for the first packet.

2. The method of claim 1, wherein detecting the packet boundary identifier comprises:
generating, at the receiver, one or more first check-values based on or in response to data in a fixed-sized window of the received message; and
determining whether a check-value of the one or more first check-values matches a first placeholder of the first packet.

3. The method of claim 2, further comprising:
generating, at the receiver, one or more second check-values based on or in response to data within a defined length of the received message; and
determining whether a check-value of the one more second check-values matches a second placeholder of the first packet.

4. The method of claim 3, further comprising:
confirming the packet boundary for the first packet when the check-value of the one or more first check-values matches the first placeholder for the first packet and the check-value of the one more second check-values matches the second placeholder for the first packet.

5. The method of claim 1, comprising:
confirming true packet boundaries for a plurality of packets of the message based on or in response to detecting boundary identifiers for respective packets of the plurality of packets.

6. The method of claim 1, comprising:
confirming false packet boundaries for a plurality of packets of the message based on or in response to detecting false boundary identifiers for respective packets of the plurality of packets.

7. The method of claim 1, comprising:
identifying a possible packet boundary for a packet of the message based on or in response to detecting a possible long placeholder.

8. The method of claim 7, further comprising:
generating a data structure representative of one or more of: the confirmed packet boundaries and possible packet boundaries for the plurality of packets.

9. The method of claim 8, further comprising:
processing the data structure to identify individual packets in the message.

10. The method of claim 8, wherein the data structure comprises a confirmation chain having one or more nodes representative of one or more of: the confirmed packet boundaries and possible packet boundaries.

11. The method of claim 9, wherein the confirmation chain comprises one of:
a singly-linked list and a graph.

12. The method of claim 2, wherein generating the one or more first check-values comprises transforming the data in the fixed-sized window with a first transformation function.

13. The method of claim 3, wherein generating the one or more second check-values comprises transforming the data within the defined length of the received message with a transformation function.

14. A method for transmitting a message from a transmitter resource, the method comprising:
generating, at the transmitter, a plurality of packets of data, each packet comprising:
a first placeholder calculated by transforming data in a fixed-sized rolling window of the message, and a second placeholder calculated by transforming all data in the respective packet including the first placeholder; and transmitting the message comprising the one or more packets to a receiver.

15. The method of claim 14, wherein one or more packets of the plurality of packets comprise a data payload.

16. The method of claim 15, wherein the data payload is an empty data payload.

17. The method of claim 16, comprising stuffing a portion of the message with one or more packets having an empty data payload.

18. The method of claim 17, wherein the total length of the portion of the message stuffed with one or more packets having an empty data payload is greater than or equal to the fixed-sized window of the message.

19. A system comprising:

a transmitter resource to transmit a message having one or more packets, each packet having a boundary identifier comprising:

a first placeholder calculated by transforming data in a fixed-sized rolling window of the message, and a second placeholder calculated by transforming all data in a respective packet including the first placeholder; and a receiver resource to receive the message and to detect the boundary identifiers of the respective packets.

20. The system of claim 19, wherein the receiver is to confirm the packet boundaries for the respective packets based on or in response to boundary identifiers.

* * * * *